(12) United States Patent
Popowski

(10) Patent No.: US 9,237,018 B2
(45) Date of Patent: Jan. 12, 2016

(54) MULTISYSTEM BIOMETRIC TOKEN

(75) Inventor: Paul M. Popowski, Lake Mills, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1968 days.

(21) Appl. No.: 11/773,741

(22) Filed: Jul. 5, 2007

(65) Prior Publication Data
US 2009/0013191 A1    Jan. 8, 2009

(51) Int. Cl.
*H04L 29/00* (2006.01)
*H04L 9/32* (2006.01)

(52) U.S. Cl.
CPC .......... *H04L 9/3231* (2013.01); *H04L 2209/80* (2013.01)

(58) Field of Classification Search
USPC .............................................. 713/186; 726/20
See application file for complete search history.

(56) References Cited

U.S. PATENT DOCUMENTS

| | | | |
|---|---|---|---|
| 6,845,453 B2 | 1/2005 | Scheidt et al. | |
| 7,043,754 B2 * | 5/2006 | Arnouse | 726/20 |
| 7,111,173 B1 | 9/2006 | Scheidt | |
| 7,314,165 B2 * | 1/2008 | Bonalle et al. | 235/380 |
| 2003/0115475 A1 * | 6/2003 | Russo et al. | 713/186 |
| 2004/0250085 A1 | 12/2004 | Tattan et al. | |

FOREIGN PATENT DOCUMENTS

| | | |
|---|---|---|
| EP | 1 237 091 A1 | 9/2002 |
| EP | 1237091 A1 * | 9/2002 |
| WO | WO 98/25385 | 6/1998 |
| WO | WO 03/007527 A2 | 1/2003 |

OTHER PUBLICATIONS

U.K. Intellectual Property Office's Search Report corresponding to Application No. GB0810531.4, dated Dec. 18, 2008.

* cited by examiner

*Primary Examiner* — Anthony Brown
*Assistant Examiner* — Michael D Anderson
(74) *Attorney, Agent, or Firm* — Husch Blackwell LLP

(57) ABSTRACT

An apparatus and a method for generating a unique user identification code for a user of a biometric security system are presented. No biometric information is stored either within the security system or on a device, and the method enables a unique user identification code to be generated to allow multi-system identification of the same user.
The method includes receiving a public key from the system, obtaining a characteristic from the user, generating a biometric value from the characteristic, creating the identification code by combining and encrypting the generated biometric value and the system supplied public key, and transmitting the identification code to the system for authentication.

15 Claims, 3 Drawing Sheets

MULTISYSTEM BIOMETRIC TOKEN

FIELD OF THE INVENTION

This invention relates generally to biometric security systems. In particular, this invention relates to a method of using the same biometric information as identification in one or more security systems without storing the biometric information in any of the security systems.

BACKGROUND OF THE INVENTION

Security systems control access to places and data by requiring those desiring access to be identified and authenticated. Biometric security systems use biometric data, such as a fingerprint, thumbprint, or retina scan, for identification and authentication. Initially the security system registers the user by storing his biometric information. Subsequently, to gain access to the system, the user must present his biometric information to be identified and authorized by the system. The biometric information can be presented, for example, by scanning a finger or thumb or retina, or by presenting a device on which the information has been stored. A variety of products exist which capture fingerprint biometric information and compare it to previously captured biometric information stored in the security system. The stored information resides either in a database on the system's network, or on a mobile biometric device, such as a smart card, that is carried by the user. Additionally, there are mobile biometric devices that capture the fingerprint biometric information and compare it to biometric information residing on the device, and then transmit a predefined credential identifier to the system in lieu of the biometric information.

One problem with the above approaches is that, since a user's biometric information must be stored either within a database in the security system or on a device the user carries, the stored information could be stolen or altered. Another problem is that the information can only be accessed by the specific system that stores the information or the credential identifier, so that the user's biometric information cannot be shared among various systems to authenticate the user.

SUMMARY OF THE INVENTION

This invention solves the above problems with an apparatus and a method whereby no biometric information is stored either within the security system or on a device, and further provides a method to allow unique multi-system identification.

Accordingly, the invention provides a method for generating a unique user identification code for a user of a biometric security system, including the steps of receiving a public key from the system, obtaining a characteristic from the user, generating a biometric value from the characteristic, creating the identification code by combining and encrypting the generated biometric value and the system supplied public key, and transmitting the identification code to the system, and an apparatus to implement this method.

The foregoing and other objects, aspects, features, and advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

An inventive solution to the need for security systems able to identify a user based on his biometric data without storing this data, and further enabling this data to be used by more than one security system, is presented.

Figure 1:
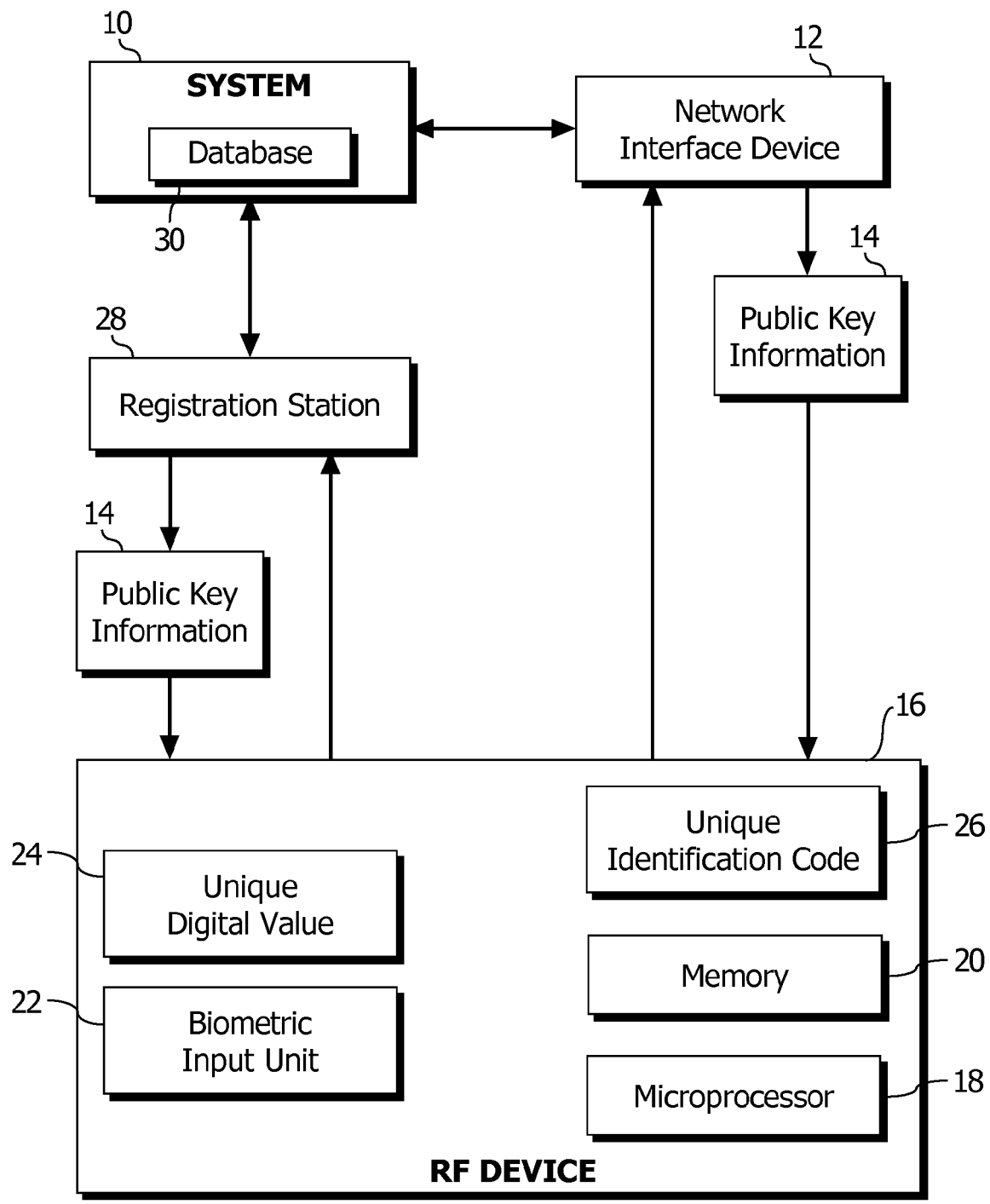
FIG. 1 is a block diagram of an exemplary embodiment of the present invention.

FIG. 1 shows an exemplary embodiment of the invention. A security system 10 can secure a physical location such as an office building, residence or other structure or groups of structures. In addition, a security system 10 can secure access to data, such as credit card databases, bank accounts, and any other collections of data and information to which authorization is required to obtain access. The security system 10 includes a registration station 28, and a network interface device 12, each of which broadcasts public key information 14 such as a system ID, and the current date and time. In one embodiment, the network interface device is a smart card RFID reader; however, other RFID readers can be used. While only one registration station 28 is shown, the system can have multiple such stations. Similarly, the system can contain multiple network interface devices, even though only one is shown. A user has an active RF device 16 that includes a microprocessor 18, flash and RAM memory 20, and a biometric input unit 22, such as a fingerprint scanner. In a preferred embodiment, the active RF device 16 is a smart card token. Other devices able to transmit and receive RF data can be used, such as mobile telephones, key fobs and laptop computers.

To register to become an authorized user of the security system 10, the user presents the RF device 16 to a registration station 28. The RF device 16 receives the public key information 14 broadcast by the registration station 28 and the RF device 16 prompts the user to present a physical characteristic or part, such as a finger, thumb, foot or retina, for input, e.g. scanning by the scanner 22. The result of this input is a biometric value. A unique digital value 24, derived from the biometric value, of the user's physical characteristic is created based on this scan. This unique digital value 24 and the system's public key information 14 are used to encrypt the system ID. The resultant value, a unique identification code 26 for the user, is stored in a database 30 in the security system 10 and can be used later to authenticate the user to the system 10. In one embodiment, this unique identification code 26 is encrypted.

To access the security system 10, a user presents the RF device 16 to the network interface device 12. The RF device 16 receives the public key information 14 broadcast by the network interface device 12 and the RF device 16 prompts the user for biometric input 22. As above, a unique digital value 24 is created from the biometric input or biometric value 22. Using this unique digital value 24 and the system's public key information 14, a unique identification code 26 for a user is determined. This unique identification code 26 is encrypted if the initially registered code had been encrypted. The unique identification code 26 is transmitted through the network interface device 12 to the security system 10 where it is authenticated. The authentication process is described in more detail below.

Figure 2:
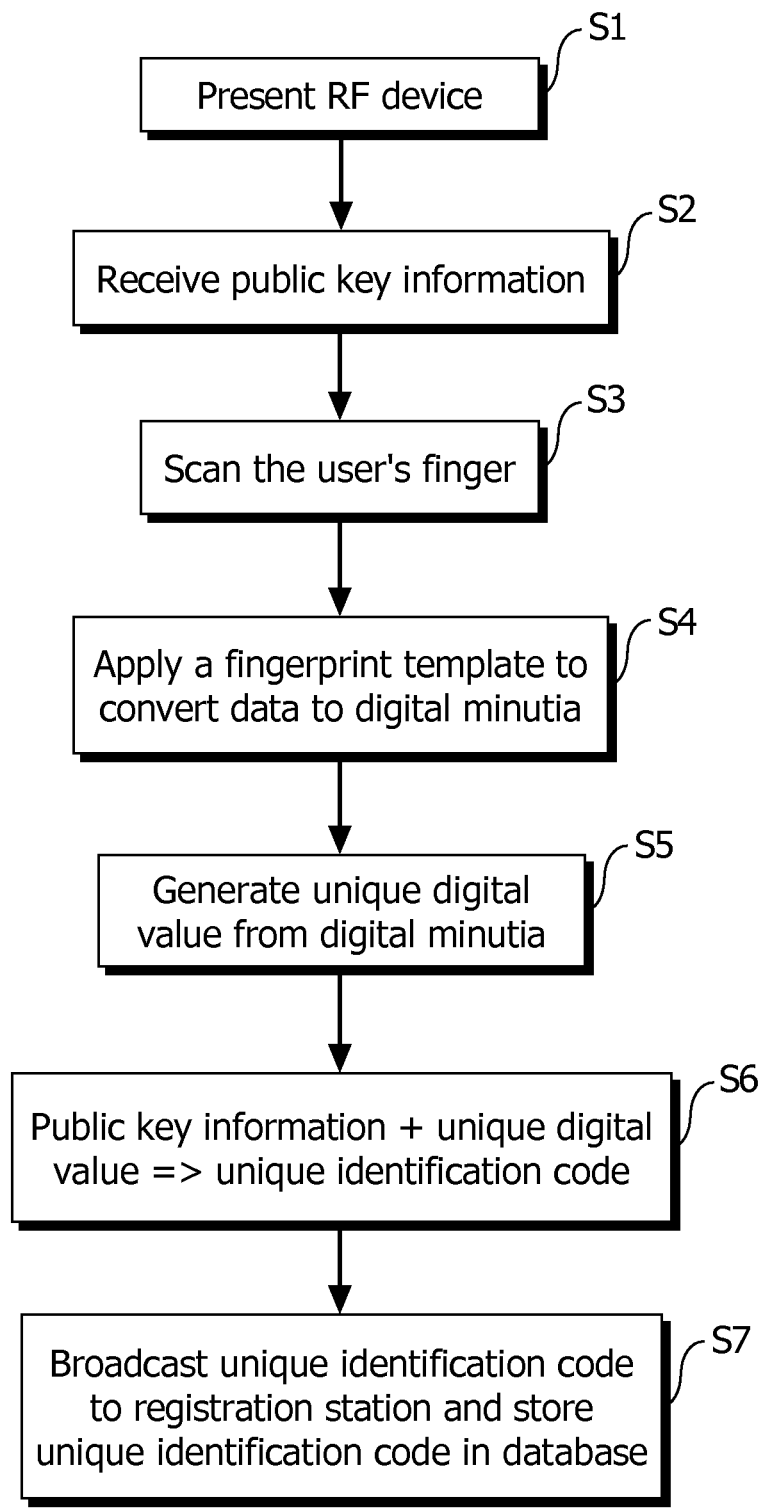
FIG. 2 is a flow diagram of the steps for creating and registering a unique identification code in one embodiment of the present invention.

FIG. 2 shows the steps in an exemplary embodiment for registering a user by creating a unique user identification code 26 in accordance with the system shown in FIG. 1. Initially, at step S1, a user presents the RF device 16 to a registration station 28 on the network. At step S2, the RF device 16 receives the public key information 14 broadcast by the registration station 28. At step S3, the biometric input unit 22 of the RF device 16 obtains a user characteristic, e.g., obtains a fingerprint by scanning the user's finger. At step S4, the fingerprint is converted to digital minutia using a fingerprint template. Other techniques for converting the input data to digital minutia can be used.

At step S5, an algorithm for generating a unique digital value 24 based on the digital minutia is executed. This algorithm could be, for example, a hash-coding algorithm that generates a unique value, i.e., the unique digital value 24, from a plurality of data, i.e., the digital minutia. Any algorithm that creates a unique data value from a plurality of input data can be used. At step S6, an encryption methodology is used to combine the public key information 14 with the unique digital value 24 to create a unique identification code 26. The encryption methodology can be, for example, a common PKI algorithm to encrypt the unique digital value 24 and the system ID obtained from the public key information 14, or the entire public key information 14 can be encrypted with the unique digital value 24. A standard PKI call to encrypt data might look like: Encrypted data=encrypt (public key, private key, data). In one embodiment of the present invention, the PKI call would look like: Encrypted system ID=encrypt (system public key 14, unique digital value 24, system ID). At step S7, the unique identification code 26 is transmitted or broadcast via the registration station 28 and stored in a database 30 in the security system 10.

Figure 3:
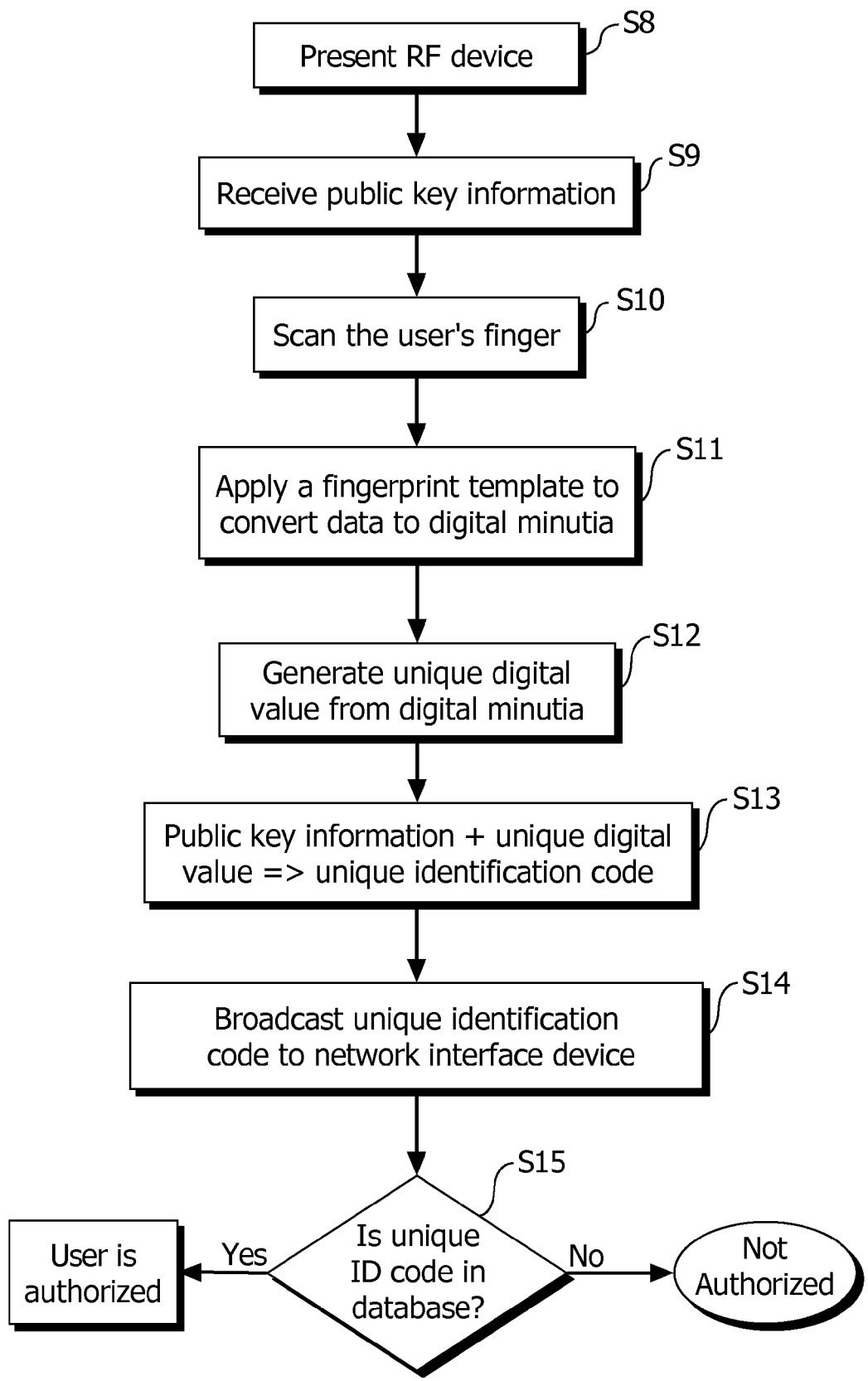
FIG. 3 is a flow diagram of the steps for authenticating a user in one embodiment of the present invention.

Authentication is performed as shown in FIG. 3 in accordance with the system shown in FIG. 1. At step S8, a user presents the RF device 16 to a network interface device 12. At step S9, the RF device 16 receives the public key information 14 broadcast by the network interface device 12. At step S80, the biometric input unit 22 of the RF device 16 obtains a fingerprint or other physical characteristic of the user. For each user, the same characteristic supplied for registration must be supplied for authorization. At step S11, the fingerprint is converted to digital minutia using a fingerprint template, or other known techniques.

At step S12, an algorithm for generating a unique digital value 24 based on the digital minutia is executed. As with the registration process discussed above, this algorithm could be, for example, a hash-coding algorithm that generates a unique value, i.e., the unique digital value 24, from a plurality of data, i.e., the digital minutia. Any algorithm that creates a unique data value from a plurality of input data can be used. The same algorithm is used for registration and authentication of a particular user, but different algorithms can be used for different users. At step S13, an encryption methodology is used to combine the public key information 14 with the unique digital value 24 to create a unique identification code 26. As with the algorithm, the same encryption methodology is used for registration and authentication for a particular user. At step S14, the unique identification code 26 is transmitted or broadcast via the network interface device 28 to the security system 10.

At step S15, the security system 10 determines whether the unique identification code 26 exists in the database 30. If the unique identification code 26 matches one in the database 30 (S15=YES), the user is authorized to use the security system 10. However, if the unique identification code 26 does not match any database 30 entries (S15=NO), the user is not authorized to use the security system 10.

Thus the broadcast public key information 14 of the security system 10 in conjunction with a unique digital value 24 based on the user's biometric information creates a unique identification code 26 which is calculated by the RF device's microprocessor 18 each time a user desires access to a security system 10. This unique identification code 26 is the user's identification code or authorization code as stored in the security system 10. The combination of broadcast public key information 14 and unique, individual biometric information as represented in a unique digital value 24 ensures that the unique identification code 26 received from any individual authorized to use the security system 10 is unique to that individual user. Consequently, the same RF device 16 can be used by multiple individuals to authenticate themselves because the RF device 16 produces a unique digital value 24 for each user based on each user's biometric information, and this unique digital value 24 is then combined with the broadcast public key information 14.

In addition, since the unique identification code 26 is calculated each time the RF device 16 is presented, standard user biometric information is not stored either in a network database in the security system 10 or on the RF device 16. Instead, the standard user biometric information, for example, fingerprint data, is stored only in combination with system identification data, that is, the broadcast public key information 14, in a system database 30. Further, this combination data is generally encrypted. Thus the security of the system is enhanced because there is no file of user information or biometric data to be compromised.

While the present invention has been described in particular embodiments, it should be appreciated that the present invention should not be construed as limited by such embodiments, but rather construed according to the below claims.

What is claimed is:

1. A method for generating a unique user identification code for a user of a biometric security system, comprising:

initially storing the unique user identification code of the user in a database of the biometric security system for later use in authenticating the user;

the user presenting a portable device to the biometric security system;

the portable device receiving a public key from the system;

the portable device obtaining a characteristic from the user;

the portable device generating a biometric value from the characteristic;

the portable device creating a putative duplicate of the identification code by combining and encrypting the biometric value and the public key; and the portable device transmitting the putative duplicate of the identification code to the system, wherein none of the obtained characteristic, the generated biometric value, any previously received characteristic corresponding the obtained characteristic or any biometric value generated from any previously received characteristic of the user is stored by itself either within the security system or on the portable device.

2. The method according to claim 1, wherein the characteristic is a scan of one of a finger, a thumb, a foot and an eye/retina.

3. The method according to claim 1, wherein the encrypting is done using a PKI algorithm.

4. The method according to claim 1, wherein the generating is done using a hash-coding algorithm.

5. The method according to claim 1, wherein the receiving is done with an RF device.

6. The method according to claim 1, wherein the public key is comprised of a system identifier, a date and a time.

7. The method according to claim 1, further comprising authenticating the user by comparing the stored user identification code with the transmitted identification code.

8. A security system comprising:
- an identification code stored within the security system for later use in authenticating a user;
- a public key broadcast by the system;
- a network interface device; and
- an RF device comprising an input unit, a memory, and a processor, wherein said input unit receives a characteristic from a user, and said processor determines a biometric value using said characteristic, creates a putative duplicate of the identification code by combining and encrypting the biometric value and the public key, and transmits the putative duplicate of the identification code to the system,
- wherein none of the received characteristic, the determined biometric value, any previously received characteristic corresponding to the received characteristic or any biometric value determined from any previously received characteristic of the user is stored by itself either within the security system or on the RF device.

9. The system according to claim 8, wherein the characteristic is a scan of one of a finger, a thumb, a foot and an eye/retina.

10. The system according to claim 8, wherein the encrypting is done using a PKI algorithm.

11. The system according to claim 8, wherein the public key is comprised of a system identifier, a date and a time.

12. The system according to claim 8, wherein the input unit is a scanner.

13. The system according to claim 8, wherein the device is a smart card token.

14. The system according to claim 8, wherein the system authenticates the user using the transmitted identification code.

15. The system according to claim 8, wherein the generating is done using a hash coding algorithm.

* * * * *